2,888,505
Patented May 26, 1959

2,888,505

PROCESS FOR THE PRESERVATION OF NATURALLY OCCURRING NATURAL RUBBER LATEX AND PRODUCT THEREOF

Walter T. L. Ten Broeck, Jr., Serbalawan, Indonesia, assignor to The Goodyear Tire & Rubber Company, Akron, Ohio, a corporation of Ohio No Drawing. Application October 12, 1956
Serial No. 615,460

9 Claims. (Cl. 260—815)

This invention relates to the preservation and stabilization of natural rubber latex and is particularly concerned with the preservation and stabilization of the latex with a minimum amount of preserving and stabilizing agents.

Latex as obtained from the rubber tree is a complex dispersion of low stability consisting of solids dispersed in an aqueous medium in the relationship of about 35% solids to 65% liquid. Generally about 5% of the solids are non-rubber solids, which include mineral salts, resins, sugars and proteins. Bacterial action breaks down carbohydrates to form acids. The protein is generally considered to surround the rubber globules and to undergo enzymatic putrefaction on standing. This tends to depress the pH of the latex until it becomes acid, at which point the rubber solids coagulate. It is therefore necessary to add preservatives to natural rubber latex in order to repress the activity of bacteria and enzymes and to maintain the latex in an alkaline condition during storage and/or shipment.

It is customary to add a preservative to freshly gathered latex as it is gathered from the field in order to prevent premature coagulation and in order to stabilize the latex until it can be further treated. A number of chemical preserving agents have been used as preliminary preservatives, e.g. ammonia, formaldehyde, strong caustics, such as sodium hydroxide and potassium hydroxide, and various combinations of these and other chemicals. In addition, various other agents have been used, such as bacteriacides, e.g. arsenic trioxide, phenols, etc. The preliminary preserving agent which is customarily preferred is ammonia. After the natural latex reaches the processing station, it is further treated in order to stabilize the latex and prevent premature coagulation during transport and processing.

These various preservatives have not been completely satisfactory. For example, formaldehyde-preserved latex tends to thicken with age and thus becomes unmanageable even though the latex does not completely coagulate. Also, formaldehyde-preserved latex displays a serious lack of mechanical stability. Ammonia must be added to latex in a substantial quantity in order to raise the pH and to buffer the latex sufficiently to inhibit the activity of bacteria and enzymes. The excess ammonia must be removed prior to processing of the latex. The combination of formaldehyde and ammonia is undesirable because they react together to form hexamethylene tetramine which inactivates both of them. The various bacteriacides are undesirable because most of them are toxic and cannot be used in many latex fabricated articles.

Thus, present methods for preserving and stabilizing natural rubber latex are unsatisfactory for one reason or another.

The present invention overcomes many of the difficulties with present practices and provides a process by which latex can be preserved for long periods of time with good mechanical stability and without the introduction of objectional or undesirable amounts of ammonia and/or preservatives.

It is therefore a general object of this invention to provide an improved process for preserving field latex.

It is a more specific object of this invention to provide an improved process for preserving latex at low ammonia content wherein latex is preliminarily preserved, followed by desludging to remove impurities and then concentrated, after which the latex is stabilized and preserved for storage and/or shipment.

It is a further object of this invention to provide a latex having new and improved characteristics.

These and other objects will be apparent as the description proceeds.

In the practice of this invention, natural rubber latex is collected from the rubber trees in the presence of an initial preservative, as desired, collected at a field station, preliminarily treated with additional preservative and thereafter processed into preserved and stabilized latex for storage and/or shipment. This invention is concerned with a low titer desludged uncoagulated natural rubber latex concentrated to a total solids content of at least 60% by weight containing, as a preservative and stabilizer, ammonia in a quantity insufficient by itself to preserve and stabilize the latex and an amine preservative such as an amine selected from the group consisting of (1) an alkylene polyamine having from 1 to 4 alkylene radicals containing from 2 to 9 carbon atoms and from 2 to 5 amine radicals, (2) a benzyl trialkyl ammonium compound having the following structural formula

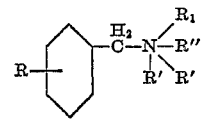

wherein R is selected from the group consisting of hydrogen and an alkyl radical having from 1 to 4 carbon atoms, R' is an alkyl radical having from 1 to 6 carbon atoms and R'' is selected from the group consisting of hydroxyl radicals, sulfate radicals, nitrate radicals and sulfide radicals; (3) disalicylal alkylene polyamines having the following structural formula

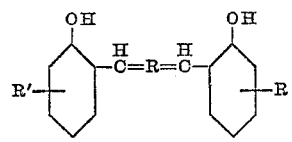

wherein R is an alkylene polyamine nucleus containing from 3 to 9 carbon atoms and from 2 to 4 nitrogen atoms and R' is selected from the group consisting of hydrogen and an alkyl radical having from 1 to 9 carbon atoms.

After the latex has been collected at the field station, small controlled amounts of ammonia are customarily added to the latex, e.g. 0.1 to 0.3% by weight, based on the total weight of field latex. Small amounts of other known preservatives, such as formaldehyde or other auxiliary preservatives, and/or bacteriacides, may be added if desired. After preliminary preservation, the latex is desludged before further treatment.

Customarily, desludging is accomplished by means of centrifugal separators or creaming vats having suitably placed outlets for removal of the latex after the sludge has settled to the bottom, although any desludging method can be used in the practice of the invention. Various methods for desludging latex are described in Latex Preservation, Concentration and Shipment by J. H. Pidford, the Rubber Research Institute of Malaya, 1947, Kuala Lumpur.

Before creaming, desludging may be effected by means of centrifugal clarifiers or by placing the preliminarily preserved latex in large vats and allowing it to stand for a period of 12 to 24 hours for the sludge to settle. The sedimentated latex is then separated from the sludge, treated with creaming agent and allowed to stand undisturbed for a period of 20–48 hours at which time the upper cream layer will have attained a total solids content of 45–60% by weight. Thereafter the serum is removed and the preliminary cream remaining is treated with an auxiliary preservative together with additional ammonia as may be desired. The preliminary cream, now fully preserved, is allowed to stand for final creaming for a sufficient length of time to reach the desired high total solids content, preferably of 65–70%. The serum is drained away and the remaining cream blended until uniform.

Centrifugal concentration is effected by passing the normal latex through a centrifuge machine. The latex is recovered as a rubber rich (cream) portion of normally 62–65% total solids content and a rubber poor (serum) portion of 5–15% total solids content. The sludge having a specific gravity greater than that of the serum and the cream remains in the centrifuge bowl.

Although the desludging and concentration are normally conducted simultaneously, they may be handled separately, if desired, in both the customary centrifuging and creaming processes. The latex is always concentrated to at least 60% by weight of rubber solids and is usually concentrated to about 62% by weight of total rubber solids by centrifuging and 66–70% by creaming. Desludging and concentration are preferably accomplished prior to the final preservation by means of any additional ammonia needed and the auxiliary preservative used. This is desirable because considerable loss of the soluble preserving agents would result from the removal of serum. Also, a number of elements in the sludge, such as phosphates and polyvalent metal ions, might interfere with the activity of the preserving agents.

The preliminarily preserved concentrated latex is treated with one or more of the preservatives of this invention in concentrations of 0.10–1.0%, preferably 0.25–0.65% by weight, based on the weight of the water in the concentrate. This is substantially equivalent to 0.04 to 0.40% by weight when based on the total weight of concentrated latex. The latex pH and titer are adjusted as desired by further addition of ammonia.

After desludging and concentration, the ammonia content is increased to about 0.1 to 1.0% by weight, based on the weight of the water in the latex, although about 0.5 to 0.8% by weight is preferred. The amount of ammonia added after desludging and concentration will depend upon the amount of residual ammonia remaining from the preliminary treatment. In order to insure alkalinity during storage and/or shipment, the pH of the latex should be adjusted to at least 8.5 to 10.5, although it may initially be as high as 11.5. This amount of ammonia is normally insufficient to preserve the latex, but when combined with the auxiliary preservatives of this invention, it is adequate. In this manner, a desirable low ammonia latex is prepared.

In combination with the ammonia, an auxiliary preservative is necessary if the latex is to be preserved while the alkalinity is maintained at the low titer required in the practice of this invention. It has been discovered that an auxiliary preservative selected from the group consisting of (1) an alkylene polyamine having from 1 to 4 alkylene radicals containing from 2 to 9 carbon atoms and from 2 to 5 amine radicals, (2) a benzyl trialkyl ammonium compound having the following structural formula

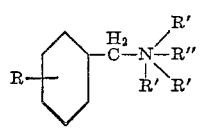

wherein R is selected from the group consisting of hydrogen and an alkyl radical having from 1 to 4 carbon atoms, R' is an alkyl radical having from 1 to 4 carbon atoms and R" is selected from the group consisting of hydroxyl radicals, sulfate radicals, nitrate radicals and sulfide radicals; (3) disalicyclal alkylene polyamines having the following structural formula

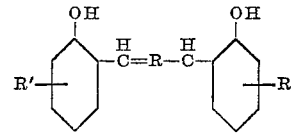

wherein R is an alkylene polyamine nucleus containing from 3 to 9 carbon atoms and from 2 to 4 nitrogen atoms and R' is selected from the group consisting of hydrogen and an alkyl radical having from 1 to 9 carbon atoms.

These chemicals serve as auxiliary preserving agents when added to the latex in controlled amounts along with ammonia, which is present by itself in an amount insufficient to preserve the latex. About 0.10 to 1.00% by weight, based on the water content of the latex, when added with ammonia in concentrations of 0.1 to 1.0%, based on the water content of the latex, is sufficient to preserve the latex against premature coagulation.

The preferred alkylene polyamines are the diamines, such as ethylene diamine, propylene diamine, butylene diamine, amylene diamine, octylene diamine and nonylene diamine; the corresponding triamines, such as diethylene triamine, dibutylene triamine, etc.; the corresponding tetramines, such as triethylene tetramine, tributylene tetramine, etc.; and the corresponding pentamines, such as tetraethylene pentamine, tetrabutylene pentamine, tetrapropylene pentamine, etc. Although the pure compounds are preferred in the practice of the invention because quantity control is easier, mixtures of the various alkylene polyamines can be used. Addition to latex should preferably be made in the form of an aqueous solution of 40% to 60% strength. Addition of 100% strength amines to latex would tend to cause local coagulation from heat evolution upon hydration of the amines.

The preferred benzyl trialkyl ammonium compounds conform to the following structural formula

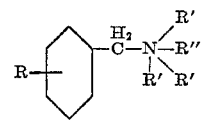

wherein R is selected from the group consisting of hydrogen and an alkyl radical having from 1 to 4 carbon atoms, R' is an alkyl radical having from 1 to 4 carbon atoms and R" is selected from the group consisting of hydroxyl radicals, sulfate radicals, nitrate radicals and sulfide radicals. Examples of suitable benzyl trialkyl ammonium compounds are benzyl trimethyl ammonium hydroxide, benzyl triethyl ammonium hydroxide, benzyl tripropyl ammonium hydroxide and benzyl tributyl ammonium hydroxide and the corresponding sulfates, nitrates and sulfides. Also, the corresponding tolyl, xylyl, trimethyl benzyl; the ethyl benzyl compounds, the propyl benzyl compounds, the butyl benzyl compounds, etc.; the secondary and tertiary hydrocarbon substituted benzyl compounds, etc. can be used in the practice of this invention.

The preferred disalicylal alkylene polyamines conform to the following structural formula

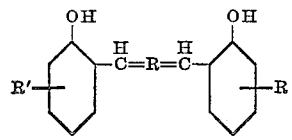

wherein R is an alkylene polyamine nucleus containing from 3 to 9 carbon atoms and from 2 to 4 nitrogen atoms and R' is selected grom the group consisting of hydrogen and an alkyl radical having from 1 to 9 carbon atoms. Examples of suitable disalicylal alkylene polyamines are disalicylal propylene diamine, disalicylal butylene diamine, disalicylal pentylene diamine, disalicylal octylene diamine, disalicylal nonylene diamine, etc.; the corresponding triamines and tetramines, the substituted disalicylal alkylene polyamines such as the methyl, ethyl, propyl, butyl, pentyl, octyl and nonyl substituted disalicylal alkylene polyamines or mixtures of the various disalicylal alkylene polyamines.

If desired, various anionic and nonionic surface active agents may be added to the latex to increase the mechanical stability properties, because they do not affect the preserving properties of the preservatives. Many useful anionic and nonionic surface active agents are contained in Synthetic Detergents and Emulsifiers, 1955, by John W. McCutcheon, MacNair-Dorland Company, Inc. These anionic and nonionic surface active agents can generally be classified as soaps of fatty acids, metallic salts of fatty acid soaps, esters of fatty acids, sulfonated oils, phosphatides, fatty amides, glycolic ethers, high molecular weight esters, terpene fatty acid salts, etc. More specifically, some of the preferred surface active agents are dialkyl esters of sulfosuccinic acids and the corresponding metallic salts, sorbitan fatty acid salts, alkyl aryl sulfonates and the corresponding metallic salts, glycollic salts of fatty acids, alkyl phenyl poly glycol ethers, alkyl aryl sulfonates, alkyl aryl polyether alcohols, metallic soaps, etc. If one or more of these surface active agents is desired, the amount should be at least 0.05% by weight, but not over 0.50% by weight, based on the total content of the latex, preferably 0.10 to 0.20%.

Specific examples of the preferred stabilizing agents are ammonium oleate or myristate and the corresponding sodium or potassium soaps. If desired, mixed soaps may be used, such as the sodium or potassium soaps of coconut oil or castor oil. The sodium salt of an alkyl aryl polyether sulfonate, or the sodium salt of alkyl aryl polyether sulfate may be used, as nonionic stabilizers. Also, the alkyl aryl polyether alcohols may be used.

In the following examples, which are not intended to be limitations on the invention, fresh latex was preliminarily treated at a field collection station with the usual low ammonia content of 0.3%, based on the weight of the latex. Thereafter, the preliminarily preserved latex was concentrated and desludged by passing it through a centrifuge. The centrifuged latex, having a total solids content of approximately 62% by weight, was further ammoniated to an ammonia content of 0.27% on the weight of latex. The 0.27% ammonia on the weight of concentrate is equivalent to 0.71% to 0.75% ammonia on the water content of 62.0% to 64.0% total solids concentrate. To the 62% rubber solids latex containing 0.27% ammonia by weight, 0.30% by weight, based on the weight of the latex of the indicated preservatives, was added. These various samples were tests periodically to determine the KOH number, the VFA number and the pH as measures of the condition of preservation.

The KOH value is a standard rubber test designated as ASTM D1076-54T and is designed to give the number of grams of KOH required to neutralize 100 grams of rubber solids latex. It is performed by adjusting the ammonia content of 50 grams of latex to 0.5% by weight, based on the water content, adding HCHO to form hexamethylene tetramine, diluting to 30% solids and adding the KOH solution to the neutral point. This test is used in the rubber industry as a standard to show the relative quality of latex. A well preserved concentrated latex increases gradually in KOH number from approximately 0.35 at one day's age to a maximum of 0.70 at six months' age. The increase is caused by normal hydrolysis of fatty acid non-rubber compounds in latex. A poorly or inadequately preserved latex will increase in KOH number at a much more rapid rate. Accordingly, a consideration of both the age and KOH number of a latex will indicate the relative quality of the latex.

The VFA (volatile fatty acid) number is a test which has been proposed for adoption by the ASTM (American Society for Testing Materials) and which is described in The Journal of Rubber Research Institute of Malaya for February 1953. The test is conducted by taking a 50 gram sample of latex, adding 50 milliliters of 40% ammonium sulphate solution thereto while warming over a water bath. After coagulation, the serum is removed and filtered. Twenty-five milliliters of the filtered serum are added to a flask and the same is acidified with 10 N sulfuric acid. A third of the acidified serum is distilled in a steam distillation apparatus until about 50 milliliters of distillate has been collected. The distillate is areated with carbon dioxide free air and titrated with 0.01 N barium hydroxide using brom-thymol blue as an indicator. The VFA number is calculated and expressed as grams KOH per 100 grams of latex solids. This test is useful for showing how well the latex is or has been preserved, i.e., the effectiveness of preservation.

A perfectly preserved and uncontaminated latex will have a VFA number of 0.01 to 0.03 as a maximum. Any increase in VFA number is generally attributed to bacterial activity resulting in end product formation of volatile fatty acids. A latex is considered satisfactory if any increase in VFA number has stopped at a value of approximately 0.10 without further increase as the latex ages.

EXAMPLE I

*Centrifuged latex at 0.27% ammonia content on total weight of latex—Treated with amine as shown*

| Sample No. | Latex Age, Days | TSC, Percent | pH | KOH No. | VFA No. |
|---|---|---|---|---|---|
| A: Control—Regular Ammoniation (1.80% NH₃ on water content). | 5 | 63.57 | 10.35 | 0.50 | 0.022 |
| | 42 | -------- | 10.42 | 0.61 | 0.021 |
| B: Control—Low Ammoniation (0.75% NH₃ on water content). | 5 | 63.92 | 9.75 | 0.70 | 0.11 |
| | 42 | -------- | 9.62 | 1.18 | 0.36 |
| C: 0.75% by weight of ammonia (on water content) +0.30% by weight of diethylene triamine (on weight of latex). | 5 | 63.51 | 10.08 | 0.49 | 0.022 |
| | 42 | -------- | 10.20 | 0.60 | 0.025 |
| D: 0.75% by weight of ammonia (on water content) +0.30% by weight of triethylene tetramine (on weight of latex). | 5 | 63.59 | 10.05 | 0.47 | 0.018 |
| | 42 | -------- | 10.20 | 0.58 | 0.018 |
| E: 0.75% by weight of ammonia (on water content) +0.30% by weight of tetraethylene pentamine (on weight of latex. | 5 | 63.61 | 10.05 | 0.49 | 0.022 |
| | 42 | -------- | 10.18 | 0.60 | 0.021 |

The effectiveness of aliphatic polyamines is shown by Example I. With regular ammoniation of 1.80% NH₃ on the latex water content, sample A, the KOH number increase was normal and the VFA number remained unchanged at 0.02, indicating no signs of bacterial activity. The low ammoniation control, sample B, with 0.75% ammonia on the latex water content was inadequately preserved in that at 42 days' latex age, the KOH number had increased to 1.18, and the VFA number to 0.36. At five days' latex age, the inadequate preservation of the B sample was shown by the high KOH number of 0.70 and the high VFA number of 0.11. Samples C, D and E, with the same low ammonia content of 0.75% on the latex water content and containing 0.3% respectively of diethylenetriamine, triethylenetetramine and tetraethylene pentamine, were all preserved equivalent to the high ammonia content control of sample A, as shown by equivalent KOH numbers and no increase in VFA numbers.

EXAMPLE II

*Centrifuged latex at 0.27% ammonia content, based on the total weight of latex—Treated with benzyl trialkyl ammonium compound as shown*

| Sample No. | Latex Age, Days | TSC, Percent | pH | KOH No. | VFA No. |
|---|---|---|---|---|---|
| A: Control—regular ammoniation. | 4 | 61.40 | 10.55 | 0.50 | 0.036 |
|  | 28 |  | 10.60 | 0.58 | 0.040 |
|  | 42 |  | 10.50 | 0.62 | 0.036 |
| B: Control—low ammonia content—0.75% by weight (on water content). | 4 | 61.45 | 9.70 | 0.73 | 0.22 |
|  | 28 | latex too thick to be tested | | | |
| C: 0.75% by weight of ammonia (on water content) +0.25% by weight of benzyl trimethyl ammonium hydroxide (on weight of latex). | 4 | 61.60 | 10.05 | 0.41 | 0.033 |
|  | 28 |  | 9.96 | 0.62 | 0.080 |
|  | 42 |  | 9.90 | 0.67 | 0.10 |

The effectiveness of benzyl trimethyl ammonium hydroxide as a preservative for low ammonia content latex is shown by the results cited in Example II. The low ammonia content control, sample B, showed marked signs of deterioration at four days' age with KOH numbers of 0.73 and an VFA number of 0.22. At 28 days' age, the B sample had practically coagulated. The C sample, with the same ammonia content and 0.25% of benzyl trimethyl ammonium hydroxide, was in good condition at 42 days' age.

EXAMPLE III

*Centrifuged latex at 0.27% ammonia content, based on the total weight of latex—Treated with disalicylal alkylene polyamine as shown*

| Sample No. | Latex Age, Days | TSC, Percent | pH | KOH No. | VFA No. |
|---|---|---|---|---|---|
| A: Control—regular ammoniation (1.71% NH₃ on water content). | 2 | 61.22 | 10.36 | 0.42 | 0.012 |
|  | 28 | 61.25 | 10.42 | 0.54 | 0.015 |
|  | 42 |  | 10.38 | 0.56 | 0.018 |
| B: Control—low ammoniation (0.76% NH₃ on water content). | 2 | 61.43 | 10.00 | 0.46 | 0.023 |
|  | 28 | 61.44 | 9.65 | 0.89 | 0.26 |
|  | 42 |  | 9.58 | 0.98 | 0.30 |
| C: Same low ammoniation as "B" +0.2% disalicylal propylene diamine (on weight of latex). | 2 | 61.34 | 10.00 | 0.48 | 0.026 |
|  | 28 | 61.35 | 9.98 | 0.55 | 0.038 |
|  | 42 |  | 9.88 | 0.58 | 0.018 |

Similar to the preceding two examples, sample C, at low ammoniation and containing 0.2% disalicylal propylene diamine, was well preserved as shown by normal KOH numbers and low VFA numbers in comparison with the results of the low ammonia control, sample B.

Although ammonia is described as the preferred alkaline material for use with the new preservatives disclosed in this invention, any basic material compatible with latex may be used, e.g., sodium or potassium hydroxide or phosphate, mono, di or tri methyl, or ethyl amine or other organic bases such as morpholine, piperidine, tetra methyl or ethyl ammonium hydroxide, etc.

While certain representative embodiments and details have been shown for the purpose of illustrating the invention, it will be apparent to those skilled in this art that various changes and modifications may be made therein without departing from the spirit or scope of the invention.

I claim:

1. A naturally occurring desludged uncoagulated natural rubber latex concentrated to a total solids content of about 60% to about 70% by weight containing as a preservative and stabilizer ammonia in a quantity insufficient to preserve and stabilize the latex and a preservative selected from the group consisting of (1) an alkylene polyamine having from 1 to 4 alkylene radicals containing from 2 to 9 carbon atoms and from 2 to 5 amine radicals; (2) a benzyl trialkyl ammonium compound having the following structural formula

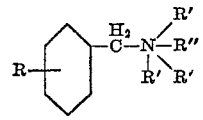

wherein R is selected from the group consisting of hydrogen and an alkyl radical having from 1 to 4 carbon atoms, R' is an alkyl radical having from 1 to 4 carbon atoms and R" is selected from the group consisting of hydroxyl radicals, sulfate radicals, nitrate radicals and sulfide radicals; (3) disalicylal and alkylene polyamines having the following structural formula

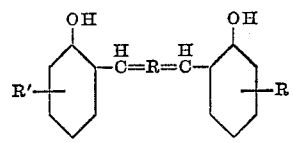

wherein R is an alkylene polyamine nucleus containing from 3 to 9 carbon atoms and from 2 to 4 nitrogen atoms and R' is selected from the group consisting of hydrogen and an alkyl radical having from 1 to 9 carbon atoms.

2. A naturally occurring desludged uncoagulated natural rubber latex concentrated to a total solids content of about 60% to about 70% by weight containing as a preservative and stabilizer from 0.1 to 1.0% by weight of ammonia, based on the weight of water in the latex, said quantity of ammonia being insufficient to preserve the latex during shipment and storage and being present in such quantity as to preclude further processing to remove the ammonia prior to use in rubber processing applications, and from 0.1 to 1.0% by weight, based on the water content of the latex, of an auxiliary preservative selected from the group consisting of (1) an alkylene polyamine having from 1 to 4 alkylene radicals containing from 2 to 9 carbon atoms and from 2 to 5 amine radicals; (2) a benzyl trialkyl ammonium compound having the following structural formula

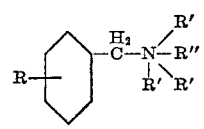

wherein R is selected from the group consisting of hydrogen and an alkyl radical having from 1 to 4 carbon atoms, R' is an alkyl radical having from 1 to 4 carbon atoms and R" is selected from the group consisting of hydroxyl radicals, sulfate radicals, nitrate radicals and sulfide radicals; (3) disalicylal alkylene polyamines having the following structural formula

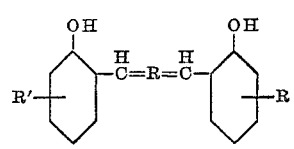

wherein R is an alkylene polyamine nucleus containing from 3 to 9 carbon atoms and from 2 to 4 nitrogen atoms and R' is selected from the group consisting of hydrogen and an alkyl radical having from 1 to 9 carbon atoms.

3. A naturally occurring rubber latex according to claim 2 wherein the auxiliary preservative is comprised of an alkylene polyamine having from 1 to 4 alkylene radicals containing from 2 to 9 carbon atoms and from 2 to 5 amine radicals.

4. A naturally occurring rubber latex according to claim 2 wherein the auxiliary preservative is comprised of a benzyl trialkyl ammonium compound having the following structural formula

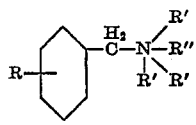

wherein R is selected from the group consisting of hydrogen and an alkyl radical having from 1 to 4 carbon atoms, R' is an alkyl radical having from 1 to 4 carbon atoms and R" is selected from the group consisting of hydroxyl radicals, sulfate radicals, nitrate radicals and sulfide radicals.

5. A naturally occurring rubber latex according to claim 2 wherein the auxiliary preservative is comprised of disalicylal alkylene polyamines having the following structural formula

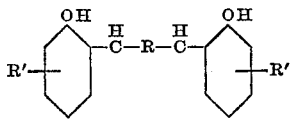

wherein R is an alkylene polyamine nucleus containing from 3 to 9 carbon atoms and from 2 to 4 nitrogen atoms and R' is selected from the group consisting of hydrogen and an alkyl radical having from 1 to 9 carbon atoms.

6. The process of preparing a naturally occurring desludged uncoagulated natural rubber latex for storage and shipment comprising (1) passing fresh naturally occurring rubber latex through a desludging and concentrating apparatus in order to remove the sludge and concentrate the latex to a rubber solids content of about 60% to about 70% by weight, (2) adding from 0.1 to 1.0 percent by weight, based on the water content of the latex, of ammonia, said quantity of ammonia being insufficient to preserve the latex during shipment and storage and being present in such quantity as to preclude further processing to remove the ammonia prior to use in rubber processing applications, and from 0.1 to 1.0% by weight, based on the water content of the latex, of an auxiliary preservative selected from the group consisting of an alkylene polyamine having from 1 to 4 alkylene radicals containing from 2 to 9 carbon atoms and from 2 to 5 amine radicals; a benzyl trialkyl ammonium compound having the following structural formula

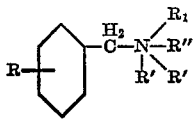

wherein R is selected from the group consisting of hydrogen and an alkyl radical having from 1 to 4 carbon atoms, R' is an alkyl radical having from 1 to 4 carbon atoms and R" is selected from the group consisting of hydroxyl radicals, sulfate radicals, nitrate radicals and sulfide radicals; disalicylal alkylene polyamines having the following structural formula

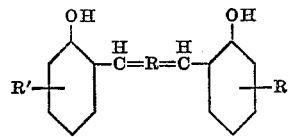

wherein R is an alkylene polyamine nucleus containing from 3 to 9 carbon atoms and from 2 to 4 nitrogen atoms and R' is selected from the group consisting of hydrogen and an alkyl radical having from 1 to 9 carbon atoms.

7. The process of preparing naturally occurring rubber latex for shipment and storage according to claim 6 wherein the auxiliary preservative is an alkylene polyamine having from 1 to 4 alkylene radicals containing from 2 to 9 carbon atoms and from 2 to 5 amine radicals as a preservative.

8. The process of preparing naturally occurring rubber latex for shipment and storage according to claim 6 wherein the auxiliary preservative is a benzyl trialkyl ammonium compound having the following structural formula

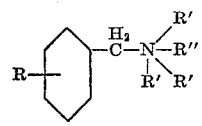

wherein R is selected from the group consisting of hydrogen and an alkyl radical having from 1 to 4 carbon atoms, R' is an alkyl radical having from 1 to 4 carbon atoms and R" is selected from the group consisting of hydroxyl radicals, sulfate radicals, nitrate radicals and sulfide radicals as a preservative.

9. The process of preparing naturally occurring rubber latex for shipment and storage according to claim 6 wherein the auxiliary preservative is a disalicylal alkylene polyamine having the following structural formula

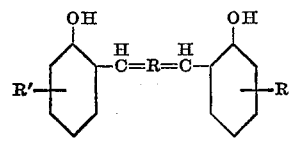

wherein R is an alkylene polyamine nucleus containing from 3 to 9 carbon atoms and from 2 to 4 nitrogen atoms and R' is selected from the group consisting of hydrogen and an alkyl radical having from 1 to 9 carbon atoms as a preservative.

References Cited in the file of this patent
UNITED STATES PATENTS

| | | |
|---|---|---|
| 2,359,667 | Ogilby | Oct. 3, 1944 |
| 2,359,698 | Uhlig | Oct. 3, 1944 |

UNITED STATES PATENT OFFICE
Certificate of Correction

Patent No. 2,888,505                                                         May 26, 1959

Walter T. L. Ten Broeck, Jr.

It is hereby certified that error appears in the printed specification of the above numbered patent requiring correction and that the said Letters Patent should read as corrected below.

Column 4, lines 8 to 13 inclusive, the formula should appear as shown below instead of as in the patent:

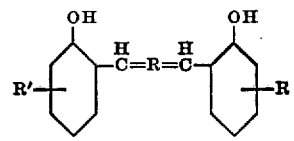

column 5, line 61, for "tests" read —tested—; column 8, line 14, strike out "and"; column 9, lines 48 to 53 inclusive, the formula should appear as shown below instead of as in the patent:

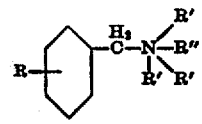

Signed and sealed this 27th day of October 1959.

[SEAL]

Attest:
KARL H. AXLINE,
*Attesting Officer.*

ROBERT C. WATSON,
*Commissioner of Patents.*